US012158691B2

(12) United States Patent
Boxer

(10) Patent No.: US 12,158,691 B2
(45) Date of Patent: Dec. 3, 2024

(54) MAGNETIC CAMERA MOUNT

(71) Applicant: BRNC INDUSTRIES PTY LTD, O'Sullivan Beach (AU)

(72) Inventor: Mark Boxer, O'Sullivan Beach (AU)

(73) Assignee: BRNC Industries PTY LTD, O'Sullivan Beach (AU)

( * ) Notice: Subject to any disclaimer, the term of this patent is extended or adjusted under 35 U.S.C. 154(b) by 145 days.

(21) Appl. No.: 17/999,997

(22) PCT Filed: May 28, 2021

(86) PCT No.: PCT/AU2021/050517
§ 371 (c)(1),
(2) Date: Nov. 28, 2022

(87) PCT Pub. No.: WO2021/237301
PCT Pub. Date: Dec. 2, 2021

(65) Prior Publication Data
US 2023/0213840 A1    Jul. 6, 2023

(30) Foreign Application Priority Data

May 28, 2020   (AU) ................................ 2020901742

(51) Int. Cl.
G03B 17/56    (2021.01)
F16M 11/04    (2006.01)
F16M 13/02    (2006.01)
F16M 11/14    (2006.01)

(52) U.S. Cl.
CPC .......... G03B 17/561 (2013.01); F16M 11/04 (2013.01); F16M 13/022 (2013.01); F16M 11/14 (2013.01); F16M 2200/08 (2013.01)

(58) Field of Classification Search
None
See application file for complete search history.

(56) References Cited

U.S. PATENT DOCUMENTS

2004/0042797 A1*  3/2004  Bratt ................. H04B 10/1127
                                                      398/128
2005/0265711 A1* 12/2005  Heibel ................... F16M 11/42
                                                      396/419
2010/0308198 A1  12/2010  Bevirt
(Continued)

FOREIGN PATENT DOCUMENTS

CN    209151238 U  *  7/2019
CN    217583789 U  * 10/2022
CN    116840638 A  * 10/2023

OTHER PUBLICATIONS https://www.kickstarter.com/projects/3footedmonster/3-footed-monster/posts>. Posts published online on May 23, 2020 and May 26, 2020.
(Continued)

Primary Examiner — Rodney E Fuller
(74) Attorney, Agent, or Firm — Sand, Sebolt & Wernow Co., LPA

(57) ABSTRACT

A camera mount with three magnetic pads acting as a tripod. Each of the magnetic pads is flexibly mounted to a base allowing them to move to conform with a curved surface thus maximising magnetic attachment. The base includes a thread on which a camera can be mounted directly or via a ball mount.

3 Claims, 3 Drawing Sheets

(56) References Cited

U.S. PATENT DOCUMENTS

2014/0016922 A1* 1/2014 Greenthal .......... F16M 11/2014
          396/419
2015/0381859 A1 12/2015 Cover
2020/0109813 A1* 4/2020 Geerds ................... F16B 47/00

OTHER PUBLICATIONS https://web.archive.org/web/20200220052345/https://rigwheels.com/product/magnetic-camera-mount/> Published online Feb. 20, 2020 (Feb. 20, 2020) as per wayback machine. whole document.
https://www.kickstarter.com/projects/3footedmonster/3-footed-monster/posts/2844162 Update #1—Published May 22, 2020 (May 22, 2020).
https://www.kickstarter.com/projects/3footedmonster/3-footed-monster/posts/2845017 Update #2—Published May 23, 2020 (May 23, 2020).
https://www.kickstarter.com/projects/3footedmonster/3-footed-monster/posts/2846227—Update #3—Published May 25, 2020 (May 25, 2020).
https://www.kickstarter.com/projects/3footedmonster/3-footed-monster/posts/2847069—Update #4—Published May 26, 2020 (May 26, 2020).

* cited by examiner

MAGNETIC CAMERA MOUNT

FIELD OF THE INVENTION

The present invention relates to a magnetic mount for a camera or other devices suitable for use on both flat and curved surfaces.

BACKGROUND TO THE INVENTION

The present invention provides a magnetic mount that has nominally been developed for video cameras, but is suitable for a myriad of other devices as well such as still cameras, microphones, smart phones, antennas, lights etcetera. The following description will reference cameras, but it is to be understood that the invention is also applicable to other types of devices.

Magnetic camera mounts are a popular choice for situations where conventional tripods are unsuitable such as a moving vehicle. Conventional magnetic mounts typically comprise a single magnetic pad onto which a camera attachment such as a ¼" UNC thread or a ball mount is fixed. Having a single pad, such mounts are unstable, particularly when placed on curved surfaces where only a small portion of the pad is in contact, typically on the periphery of a pad where the magnetic field is weakest. Some mounts are known with multiple pads which are more stable, but are still inadequate on curved surfaces as only a portion of each of the pads makes contact with the surface below The object of this invention is to provide a magnetic camera mount suitable for use on both smooth and flat surfaces to alleviate the above problems, or at least provide the public with a useful alternative.

SUMMARY OF THE INVENTION

In a first aspect the invention provides a camera mount comprising a base, a threaded member for attaching to the camera and at least three magnetic pads, wherein the magnetic pads are attached to the base via compression springs.

Preferably the mount further comprises stops for maintaining the springs in compression, the stops comprising elongate members passing through holes in the base and the insides of the springs and fixedly attached to the magnetic pads, and preferably the stops further comprise a head of diameter greater than the diameter of the holes in the base to retain the stops to the base.

In preference the holes in the base are sized to leave a gap around the elongate members so that the elongate members and attached magnetic pads can swivel with respect to the base.

Preferably the base further comprises sockets surrounding the holes in the base and the heads of the elongate sit within the sockets.

The base may comprise a tether attachment.

A ball mount may be fitted between the threaded member and the camera.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DRAWING COMPONENTS

Figure 1A:
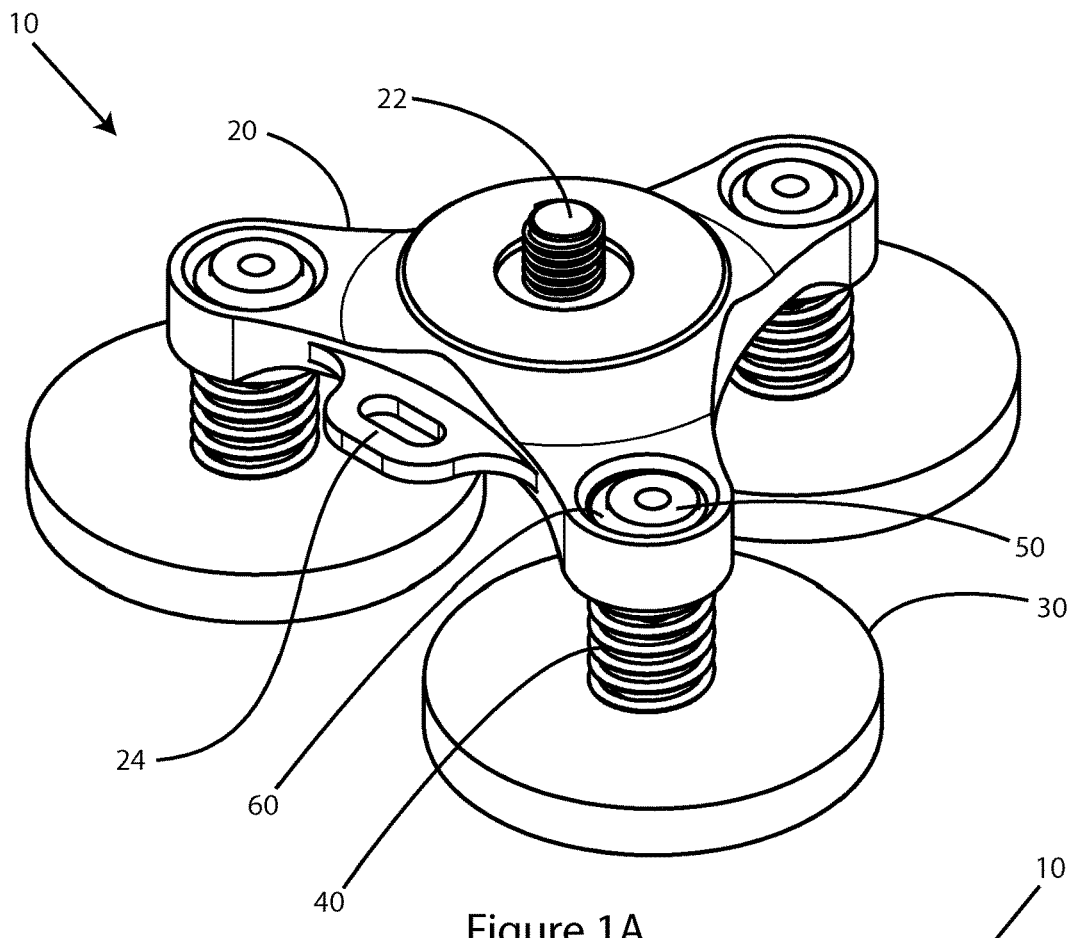
FIGS. 1A and 1B show above and below perspective view of a camera mount according to a preferred embodiment of the invention.

The drawings include the following integers.
10 magnetic camera mount
20 base
22 threaded member
24 tether attachment
26 magnetic pad attachment holes
28 sockets
30 magnetic pad
32 boss
33 screw hole
34 disc
36 magnets
40 compression spring
50 stop/screw
52 elongate body
54 head
60 nylon washer

DETAILED DESCRIPTION OF THE INVENTION

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

The present provides a camera mount with magnetic pads that are attached to a base via springs held in compression by stops. This arrangement allows the pads to swivel and conform to a curved attachment surface such as a car body thus maximising magnetic holding strength.

Figure 1B:
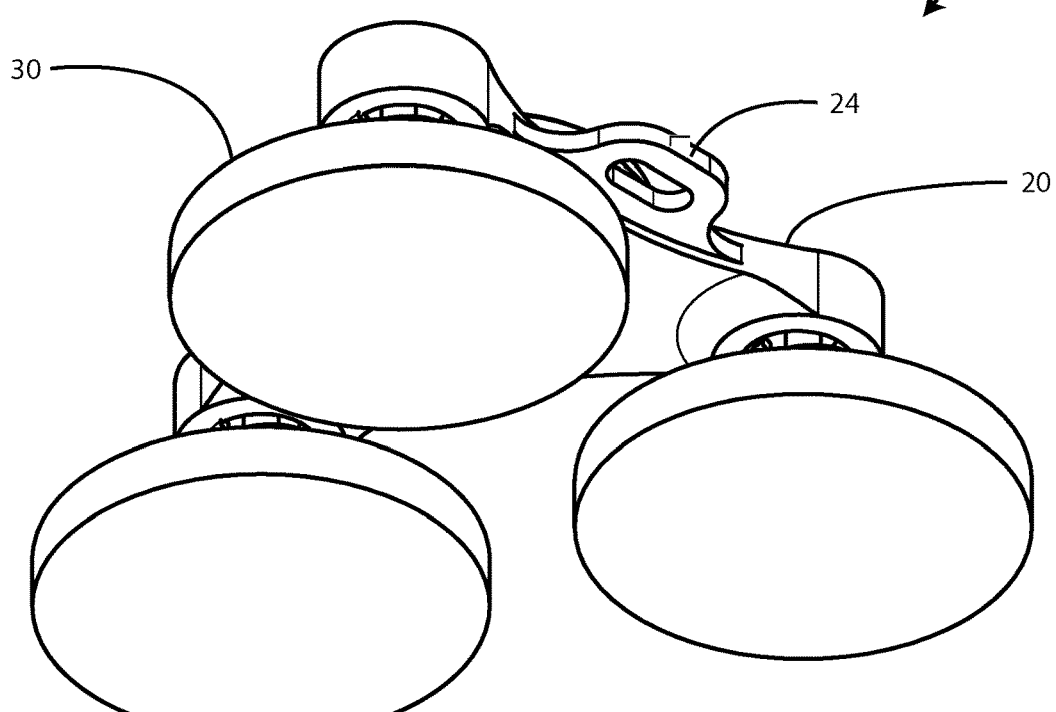

A camera mount 10 according to a preferred embodiment of the invention is shown in above and below perspective views in FIGS. 1A and 1B. The mount 10 comprises a triangular base 20 with holes 26 (obscured) disposed towards each apex for attaching magnetic pads 30. A central threaded member 22 allows for attachment of a camera, either directly or via an intermediary device such as a ball mount. The threaded member has a ¼" UNC thread compatible with most consumer cameras. Alternatively, a ⅜" UNC threaded member may be fitted as used in some professional cameras. The base includes a tether attachment 24 for securing the mount should the magnetic pads be overcome by excessive force and dislodged from the attachment surface.

The magnetic pads 30 are attached to the base 20 via stops in the form of screws 50. The shanks 52 of the screws pass through holes 26 in the base and are screwed into bosses 32 of the magnetic pads. The holes 26 have a greater diameter than the screw shanks, allowing the screws and attached magnetic pads to swivel. The heads 54 of the screws are greater in diameter than the holes 26 so that magnetic pads are effectively retained to the base 20. The holes 26 have surrounding sockets 28 in which sits the heads 54 of the screws sit atop nylon washers 60 to allow the screws to swivel smoothly. The screws 50 pass through compression springs 40 placed between the base 20 and the magnetic pads 30. The springs are always in compression and serve to steady the magnetic pads whilst allowing them to swivel.

Figure 2:
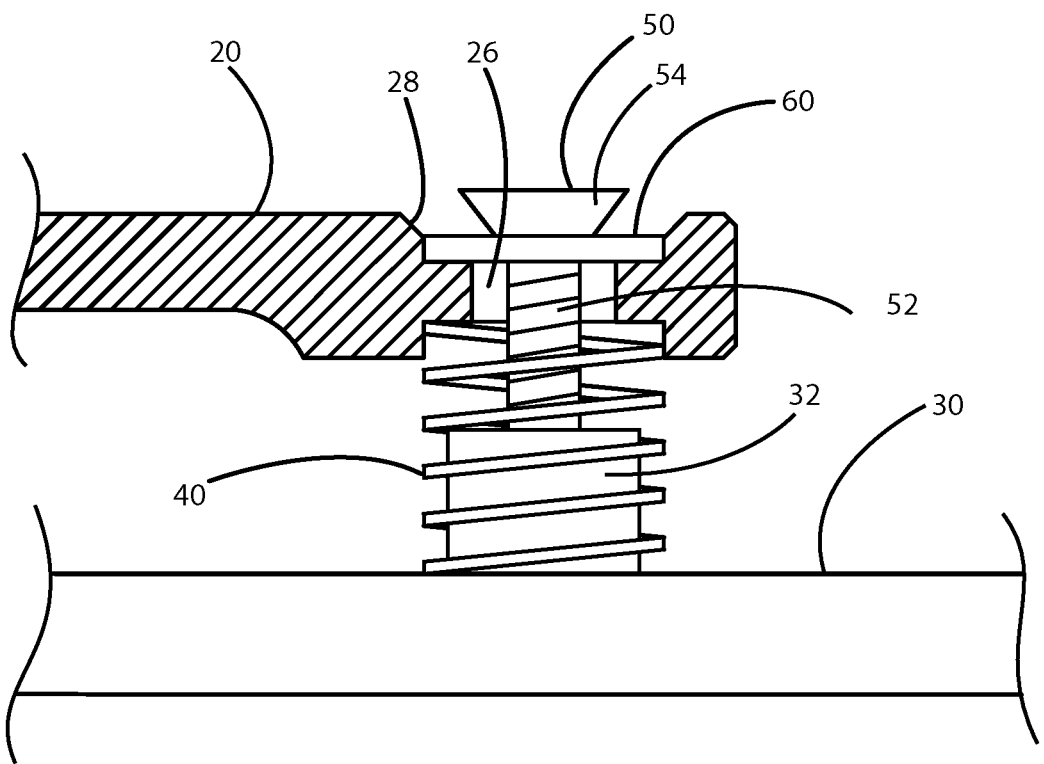
FIG. 2 shows a partial cross sectional view of the camera mount showing how the magnetic pads are attached in a neutral position.
Figure 3:
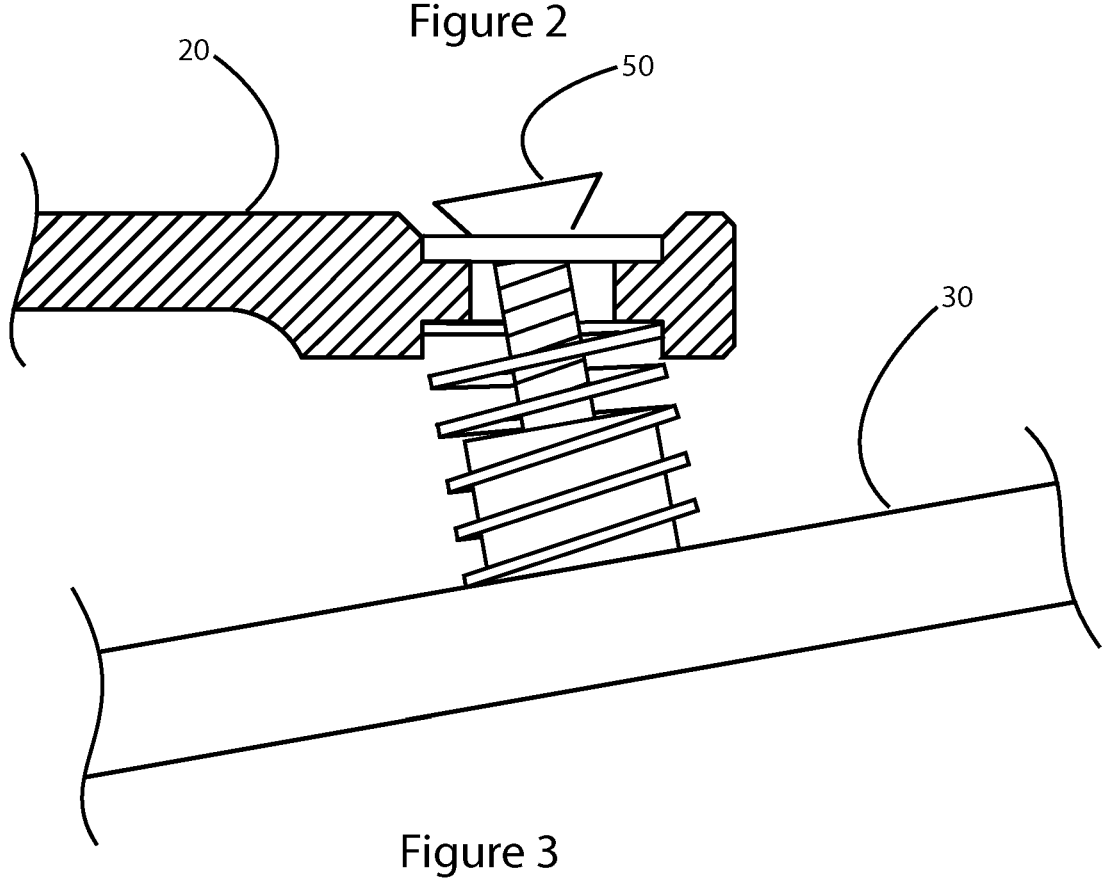
FIG. 3 shows a partial cross sectional view of the camera mount showing how the magnetic pads are attached in a tilted position.

FIG. 2 shows a partial cutaway view of the camera mount 10 showing details of how a screw 50 and attached magnetic pad 30 are mounted in a neutral position. FIG. 3 shows the same view with the screw 50 and attached magnetic pad 30 tilted.

The three magnetic pads 30 are independently retained to the base 20, allowing them to tilt independently and thus allow the camera mount 10 to conform to a variety of different curved surfaces.

Figure 4A:
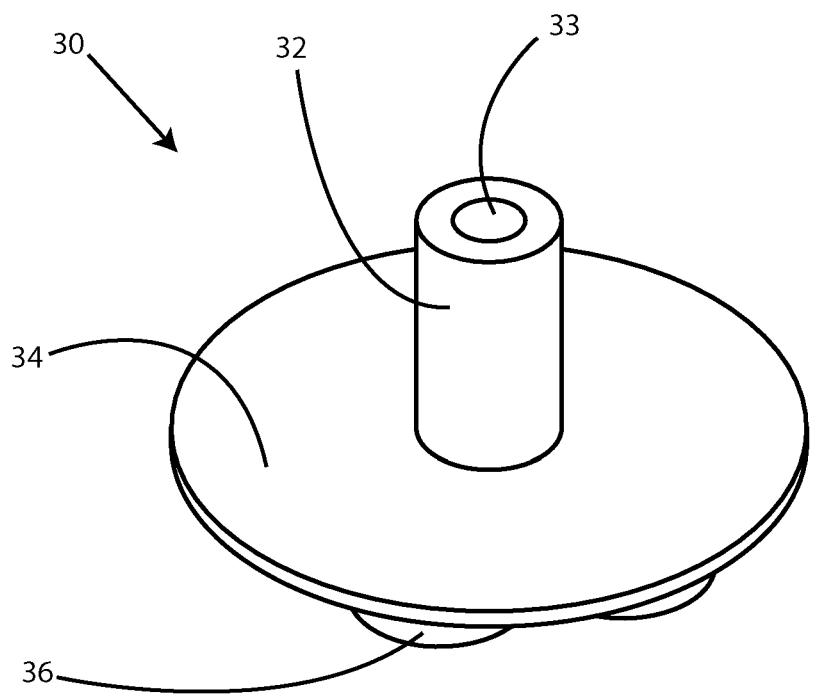
FIGS. 4A and 4B show above and below perspective views of a magnetic pad with its outer covering removed.
Figure 4B:
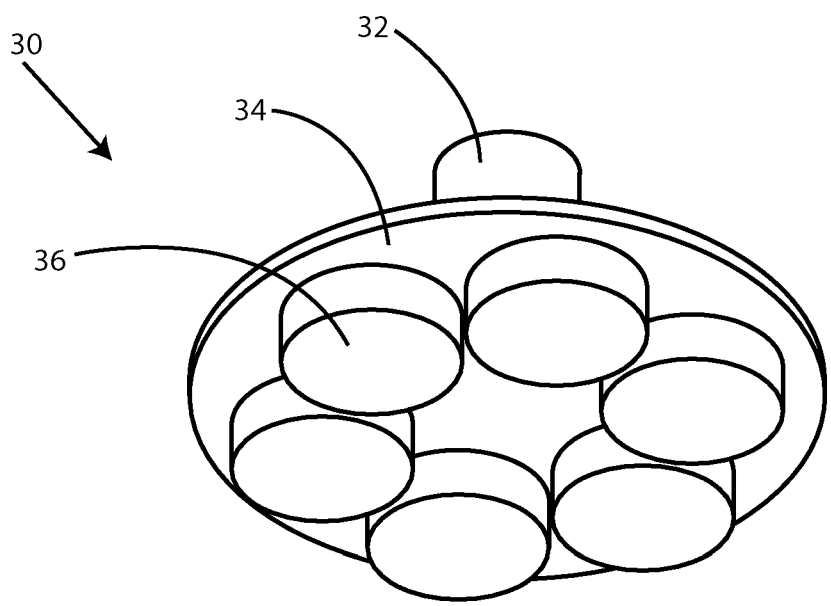

The magnetic pads 30 are covered with rubber to protect the surface to which the magnetic mount 10 is attached. FIGS. 4A and 4B show a magnetic pad 30 with its rubber covering removed to reveal incorporate a series of rare earth magnets 36 mounted on a disc 34 with boss 32 with screw hole 33. The disc serves as a yoke between adjacent magnets which are arranged with their poles antiparallel. A magnetic circuit is completed between adjacent magnets by the magnetically susceptible surface to which it is attached.

The magnetic mount 10 can be made in a variety of size to suit use with different sized equipment. The smallest consumer version as shown in the figures includes three 42 mm diameter magnetic pads 30 with six magnets each and centres attached to the base 50 mm apart. Larger versions of the magnetic mount may include a larger base and larger magnetic bases and/or more magnetic bases with more and/or larger magnets. With larger versions the size of the various components scale up in proportion to each other. Models with 66 mm and 88 mm magnetic pads have been trialled and show greater slide and pull strength. Tests show that the smallest consumer version mounted on a 0.8 mm thick vehicle panel can sustain a 10 kgf slide force and 12 kgf pull force. Preferably the base 10 is machined from 6061 T6 aluminium and anodised, whilst the screws and springs are stainless steel making the magnetic base suitable for use in a variety of environments The reader will now appreciate the present invention which provides a magnetic mount for a camera that is able to conform to a variety of curved surfaces whilst providing considerable attachment strength.

Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:

1. A camera mount comprising a base, a threaded member for attaching to the camera; at least three magnetic pads attached to the base via compression springs;
   at least one stop for maintaining the compression springs in compression;
   wherein each of the at least one stop comprise:
      at least one elongate member having a first diameter passing through a hole of a second diameter in the base and an inside of the compression spring;
      wherein the elongate member is fixedly attached to the at least three magnetic pads;
      a head having a third diameter greater than the second diameter of the holes in the base to retain the at least one stop to the base;
   wherein the second diameter of the holes in the base is greater than the first diameter of each of the at least one elongate members to leave a gap around each of the at least one elongate member so that each one of the at least one elongate member and the attached magnetic pad of the three magnetic pads can swivel with respect to the base.

2. The camera mount as in claim 1, wherein the base further comprises sockets surrounding the holes in the base and the heads of each one of the at least one elongate members sit within the sockets.

3. The camera mount as in claim 1, wherein the base comprises a tether attachment.

* * * * *